United States Patent [19]

Grabowski

[11] Patent Number: 4,824,148
[45] Date of Patent: Apr. 25, 1989

[54] DEVICE FOR SEALINGLY FIXING A TUBE OR PIPE TO AN END COUPLING

[75] Inventor: Jean Grabowski, Chalette-sur-Loing, France

[73] Assignee: Hutchinson, Paris, France

[21] Appl. No.: 113,938

[22] Filed: Oct. 27, 1987

[30] Foreign Application Priority Data

Oct. 30, 1986 [FR] France ................... 86 15118

[51] Int. Cl.$^4$ ............................................. F16L 17/00
[52] U.S. Cl. ..................................... 285/110; 285/369
[58] Field of Search .................... 285/110, 111, 97, 8, 285/369

[56] References Cited

U.S. PATENT DOCUMENTS

| | | | |
|---|---|---|---|
| 2,071,780 | 2/1937 | Aghnides | 285/110 X |
| 2,244,280 | 6/1941 | Aghnides | 285/110 X |
| 2,304,114 | 12/1942 | Moore | 285/8 |
| 3,408,091 | 10/1968 | Zylstra | 285/8 X |
| 4,102,472 | 7/1978 | Sloan | 285/111 X |

FOREIGN PATENT DOCUMENTS

| | | |
|---|---|---|
| 8522921 | 2/1982 | Fed. Rep. of Germany . |
| 1132394 | 2/1983 | Fed. Rep. of Germany . |
| 2048468 | 4/1984 | Fed. Rep. of Germany . |
| 3446737 | 9/1985 | Fed. Rep. of Germany ...... 285/110 |
| 1225427 | 3/1971 | United Kingdom ............... 285/110 |
| 734228 | 7/1973 | United Kingdom . |
| 2121122 | 2/1982 | United Kingdom . |

Primary Examiner—Dave W. Arola
Attorney, Agent, or Firm—Bell, Seltzer, Park & Gibson

[57] ABSTRACT

The invention provides a device for fixing a tube or hose to an end coupling, including an element fixed by its internal face over at least a part of its length to the external face of the tube or hose, said element being adapted so as to form at its free end, distant from that fixed to the tube or hose, an annular peripheral lip having a valve forming end and cooperating with the external surface of the end coupling so as to define a chamber communicating by said end with the inner volume of the tube or hose and end coupling so that a fluid flowing through the end coupling and the tube fills said chamber so as to apply said sealing lip against the coupling with a force which is all the higher the greater the pressure in the chamber, the pressure in the chamber increasing with the pressure of the fluid flowing through the end coupling and tube or hose, but not substantially decreasing when the pressure flowing through the end coupling and hose decreases.

8 Claims, 1 Drawing Sheet

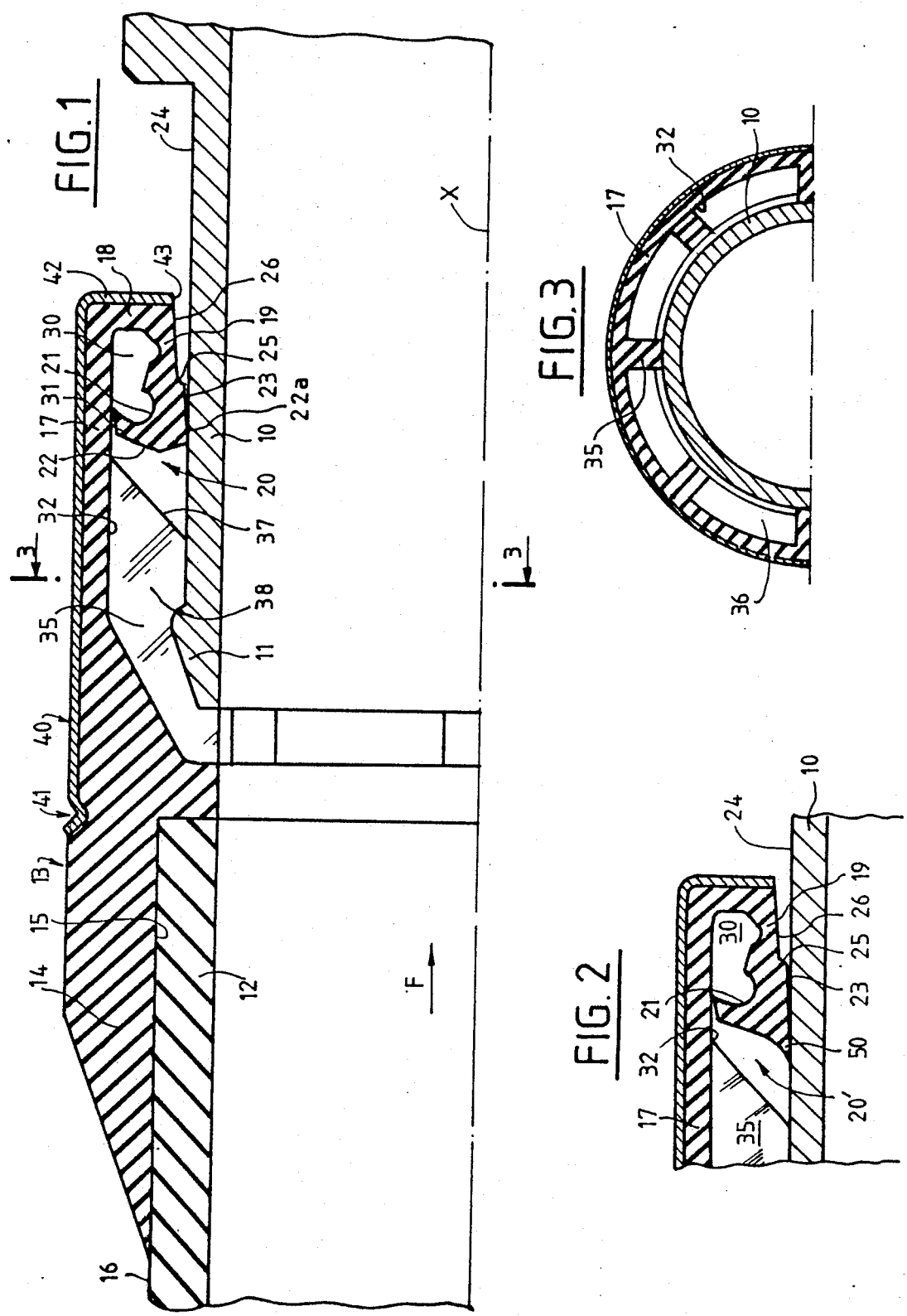

DEVICE FOR SEALINGLY FIXING A TUBE OR PIPE TO AN END COUPLING

BACKGROUND OF THE INVENTION

The invention relates to a device for sealingly fixing a tube or pipe to an end coupling.

It relates in particular to a device for rapidly fixing a flexible pipe or hose to an end coupling such, for example, as a hose to the coupling of a motor vehicle radiator or heating system, without this indication of course having any limitative character.

Devices are known for fixing a hose to a coupling in which sealing between the hose and the coupling—in so far as a fluid flowing through said hose is concerned—is provided by intimately fitting the hose and the coupling together by means of an appropriate member, generally a metal wire or strip clamping collar fixed to the hose prior to positioning thereof or added to the hose after it has been positioned on the coupling and which is clamped so as to take into account the subsequent deformation of the material forming the hose, caused by its aging, as well as the residual pressure which must be sufficient to provide the necessary sealing in time.

Whatever the type of clamping collar used, its use has drawbacks related to the very principle of the collar, such as that of not being able to present a perfect circle (and consequently a uniform pressure on the hose sometimes causing sealing defects), that of requiring management of supplies to take into account the hoses, on the one hand, the collars and the component parts thereof, on the other, or else those related to manual fitting which cannot exclude defective positioning of the collar, in some cases, which, by increasing the fitting times, causes an increase in costs.

Furthermore, known collar devices are not adapted for positioning by means of robots, or manipulators, whereas motor vehicle manufacturers who desire to have an automation of the assembly lines as complete as possible desire the fitting of a tube or hose on an end coupling to be provided by robotization techniques.

It is consequently an object of the invention to provide such a device for overcoming the above mentioned drawbacks of known collar devices.

It is in particular an object of the invention to provide such a device which may be used in automatic assembly lines, particularly in the motor vehicle industry field.

It is a further object of the invention to provide such a device which, after fitting, provides a good connection of the tube or hose to the end coupling and sealing of this connection which is all the better, as far as a fluid flowing through said hose is concerned, the greater the pressure of said fluid.

It is finally an object of the invention to provide such a device which lowers the costs of working with respect to known collar devices, not only in so far as stock management is concerned but also the fitting time.

SUMMARY OF THE INVENTION

A device of the invention, for fixing a tube or hose to an end coupling includes an element fixed by its internal face over at least a part of its length to the external face of the tube or hose, said element being adapted so as to form at its free end, distant from that fixed to the tube or hose, an annular peripheral lip having a valve forming end and cooperating with the external surface of the coupling so as to define a chamber communicating through said end with the inner volume of the tube or hose and the coupling so that a fluid flowing through the coupling and the tube fills said chamber so as to apply said sealing lip against the coupling with a force all the higher the greater the pressure in the chamber, said pressure in the chamber increasing with the pressure of the fluid flowing through the coupling and the tube or hose but not substantially decreasing when the pressure flowing through the coupling and the tube or hose decreases.

According to another characteristic of the invention, the element adapted so as to have the sealing lip is fixed to the tube or hose by molding.

For maintaining the device on the coupling which, in a way known per se, has an end flange, it is provided with projecting portions on the internal face of the lip element, said portions being formed so as to allow ready fitting of the tube or hose on the coupling by means of a manipulator or robot or similar, on the one hand, and, on the other, the passage of fluid flowing through the coupling and the tube or hose as far as said chamber adjacent the sealing lip.

In a preferred embodiment, the projecting portions are formed by webs extending radially over the internal surface of said element and whose cross section, through a plane passing through the axis of revolution of the device, is somewhat in the form of a truncated cone to facilitate fitting of the device on the end coupling while opposing a movement in the reverse direction tending to remove the device.

According to another characteristic of the invention, the lip element is provided, in the vicinity of its end adjacent said lip, with a flanged ring provided for opposing the pressure exerted by the fluid present in the chamber defined by said lip and, thus, the deformation of the free end of the device.

In a preferred embodiment, the lip is joined to an end ring limiting said chamber by a zone of greater deformability than the rest of the lip.

The invention also relates to a coupling hose for a motor vehicle radiator or heating system including a device such as defined above.

BRIEF DESCRIPTION OF THE DRAWINGS

The invention will be better understood from the following description, given by way of example, with reference to the accompanying drawings in which:

FIG. 1 is a longitudinal sectional view of a device of the invention in a first embodiment;

FIG. 2 is a partial view of a variant; and

FIG. 3 is a sectional view through line 3—3 of FIG. 1, but on a smaller scale.

DESCRIPTION OF THE PREFERRED EMBODIMENTS

Reference is made first of all to FIG. 1 which shows a first embodiment of the device of the invention. This device is provided for fixing, to an end coupling 10 with end flange 11, a tube or hose 12, for example the coupling hose of a motor vehicle radiator or heating system and it includes essentially an element 13, in the general form of a sleeve molded on the hose 12. Element 13 thus has an end portion 14 fixed by its internal surface 15 to the external surface 16 of tube or hose 12 and, at its other end, a cylindrical portion 17, of smaller thickness than portion 14, and which ends in a ring 18 extending substantially perpendicularly to the axis of symmetry X of the device. To ring 18 is attached, by a zone of greater deformability, a lip 20 directed inwardly of element 13 and whose height is such that it engages with portion 17.

As can be seen in FIG. 1, the cross section of lip 20 through a plane passing through the axis X is a profile which, from the zone 19, includes an internal portion 21 in the form of a gutter with flat edge, an end face 22 with a step which, from its contact zone 22a with the external surface 24 of the coupling in the condition of use of the device, is continued towards zone 19 by a rectilinear portion 23, then after a shoulder 25 by an inclined rectilinear portion 26 joined to ring 18.

Lip 20, the cylindrical portion 17 and the ring shaped bottom 18 thus form an annular chamber 30 which is adapted to communicate with the inner volume of end coupling 10 and tube or hose 12 through a passage which is formed between the internal surface 32 of the cylindrical portion 17 and the end 31 of lip 20 when this latter is moved away from portion 17 with which it cooperates in the manner of a valve, so that the pressure which reigns inside chamber 30, which pressure ensures sealing, may be very much greater than that of the fluid flowing through the coupling and the tube or hose if the pressure of the fluid which flows has previously been greater than the present pressure. Thus, if the pressure was at a moment high enough for sealing to be perfect, there will consequently be no leak even if the pressure becomes very low, which solves the difficult problem of sealing at low pressures.

According to another characteristic of the invention, means are provided for preventing undesirable removal of the device from the coupling while allowing ready fitting of tube or hose 12 equipped with the device on the coupling by means of a manipulator, a robot or similar. In the embodiment described and shown, these means are formed by webs 35, FIGS. 1 and 3, depending radially from the internal surface 32 of the cylindrical portion 17 and evenly spaced apart from the angular point of view over said cylindrical surface 17 so that they form passages 36 through which the fluid flowing inside the coupling and the tube or hose may pass into chamber 30 when the valve formed by lip 20 is open.

Webs 35, for example ten or so in number, have a front zone 37, i.e. the closest to the free end of the device, which is slanted with respect to axis X and an internal median portion 38 of a shape matching that of the flange 11 of coupling 10, so that when the device is fitted on the coupling, very simply be relative movement in the direction of arrow F, said webs do not oppose an appreciable resistance to crossing the flange of the coupling, whereas undesirable removal is prevented when the median zone 38 of said webs cooperates with the flange 11.

An annulus 40 fixed to the external face of the cylindrical portion 17 with a flange 42 on ring 18 contributes to holding the device on the coupling, said annulus being held in position on element 13 by clipping shown at 41. Flange 42 has a central opening 43 whose diameter is slightly greater than that of the external lateral surface 24 of the end coupling so that it does not prevent crossing of the flange 11 during positioning of the device. After this latter, lip 20 cooperates under a low pressure with coupling 10 so that it undergoes no damage. When a pressurized fluid flows in coupling 10 and tube or hose 12, it fills chamber 30 which it reaches after passing through passages 36 and the valve formed by lip 20 and causes the pressurized application of lip 20 against the coupling, outward deformation of the device being prevented by annulus 40.

The device is thus simple to use, easy to fit and has a long operating life.

When it is intended to equip motor vehicle radiators or heating systems, the material forming element 13 is advantageously chosen so as to allow temperatures of use between −40 and 120° C. with, in addition, a good resistance to flowing, sufficient chemical resistance to oil, diesel oil, and petrol projections as well as good temperature aging characteristics.

Materials fulfilling the above conditions are for example those known as EPDM, nitrile or silicon based PVCs.

Good results have been obtained in a device of the invention using an element 13 made from EPDM rubber in the shape of a sleeve 56 mm in length and in which the cylindrical part 17 had a thickness of 2 mm, the coupling being a cylindrical end coupling with a diameter of 32.5 mm.

In the variant shown in FIG. 2, the end of the device includes a lip 20' which, after the portion 21 in the form of a gutter with flat edges opposite the internal surface 32 of the cylindrical portion 17 is continued not by a stepped face but by a tapered zone 50 in contact with the external surface 24 of the end coupling, which is then extended by portion 23, the set-back 25 and portion 26 as far as the zone of greatest deformability 19 and ring 18.

What is claimed is:

1. A device for fixing a hose to an end coupling in fluid communication wherein the end coupling has an external face, the device comprising a generally cylindrical element having an internal surface, a portion of said internal surface being fixed to an external surface of the hose, and the element having a free end portion adapted to be positioned around the external face of the end coupling, said device further including an annular peripheral lip at the free end portion of the element located inwardly of the internal surface of the element for engaging the external face of the coupling, said annular peripheral lip having a deformable end portion curved toward and engaging said internal surface of said element and defining an annular chamber between said annular lip and said internal surface of said element, said deformable end portion further being curved inwardly to said annular chamber and effectively forming a valve for said annular chamber, said chamber being in fluid communication through said valve with the hose whereby said chamber is pressurized to an elevated fluid pressure by fluid pressure in the hose thereby forcing said annular lip into tight sealing engagement with the outer surface of the coupling, and the chamber substantially maintaining the elevated fluid pressure during subsequent times of lower fluid pressure in the hose and end coupling.

2. The device as claimed in claim 1, wherein said element is integrally secured to the hose by molding.

3. The device as claimed in claim 1, wherein said element comprises projecting portions, projecting from the internal surface towards the external surface of the end coupling for allowing easy fitting of the hose on the end coupling.

4. The device as claimed in claim 3, wherein said projecting portions are formed by webs extending radially over the internal surface of said element and whose cross section through a plane passing through the axis of revolution of the device is somewhat in the form of a truncated cone so as to facilitate fitting of the device on the end coupling while opposing a movement in the opposite direction tending to remove it.

5. The device as claimed in claim 1, wherein said element is provided at its free end in the vicinity of said sealing lip with a flanged annulus which opposes the pressure exerted by the fluid present in said chamber.

6. The device as claimed in claim 1, wherein said element comprises an end ring and a connecting portion of greater deformability than the rest of the lip located between said end ring and said lip.

7. The device as claimed in claim 1, wherein the height of the deformable end portion exceeds the distance between the inner surface of the element and the external face of the end coupling.

8. A coupling assembly for a motor vehicle heat exchanger, comprising a hose, an end coupling and a device for fixing said hose in fluid communication to said end coupling, said device including a generally cylindrical element having an internal surface, a portion of said internal surface being fixed to an external surface of said hose, the element having a free end portion generally positioned around the external face of said end coupling, said device further including an annular peripheral lip at the free end portion of the element located inwardly of the internal surface of the element for engaging the external face of the coupling, said annular peripheral lip having a deformable end portion curved toward and engaging said internal surface of said element and defining an annular chamber between said annular lip and said internal surface of said element, said deformable end portion further being curved inwardly to said annular chamber and effectively forming a valve for said annular chamber, said chamber being in fluid communication through said valve with said hose whereby said chamber is pressurized to an elevated fluid pressure by fluid pressure in the hose thereby forcing said annular lip into tight sealing engagement with the outer surface of said end coupling, and the chamber substantially maintaining the elevated fluid pressure during subsequent times of lower fluid pressure in the hose and end coupling.

* * * * *